(12) United States Patent
Katase et al.

(10) Patent No.: US 11,832,010 B2
(45) Date of Patent: Nov. 28, 2023

(54) CONVERSION APPARATUS, APPARATUS, AND SUBSTRATE

(71) Applicant: CANON KABUSHIKI KAISHA, Tokyo (JP)

(72) Inventors: Yu Katase, Kanagawa (JP); Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/706,083

(22) Filed: Mar. 28, 2022

(65) Prior Publication Data
US 2022/0321823 A1 Oct. 6, 2022

(30) Foreign Application Priority Data

Apr. 2, 2021 (JP) .................................. 2021-063494

(51) Int. Cl.
*H04N 25/77* (2023.01)
*H04N 25/40* (2023.01)
*H04N 25/79* (2023.01)

(52) U.S. Cl.
CPC ............ *H04N 25/77* (2023.01); *H04N 25/40* (2023.01); *H04N 25/79* (2023.01)

(58) Field of Classification Search
CPC ........ H04N 25/77; H04N 25/40; H04N 25/79; H04N 25/771; H04N 25/74; H04N 25/709
See application file for complete search history.

(56) References Cited

U.S. PATENT DOCUMENTS

| 2009/0244344 | A1* | 10/2009 | Takayanagi | .......... | H04N 25/617 |
| | | | | | 348/308 |
| 2014/0078363 | A1 | 3/2014 | Amikawa | | |
| 2015/0077609 | A1 | 3/2015 | Okamoto et al. | | |
| 2019/0373195 | A1* | 12/2019 | Minagawa | ............. | H04N 25/75 |
| 2022/0216253 | A1* | 7/2022 | Brady | ............... | H01L 27/14603 |

FOREIGN PATENT DOCUMENTS

| JP | 2011254544 A | 12/2011 |
| WO | 2012160775 A1 | 11/2012 |
| WO | 2013164961 A1 | 11/2013 |

* cited by examiner

*Primary Examiner* — Michael E Teitelbaum
(74) *Attorney, Agent, or Firm* — CANON U.S.A., INC. IP Division

(57) ABSTRACT

A conversion apparatus includes a conversion unit, a first transistor configured to receive a charge in the conversion unit at a gate thereof, a second transistor connected to the gate, a signal line configured such that a signal is output from the first transistor thereto, a third transistor provided in a path between the signal line and the first transistor, a first line configured to supply a potential for turning off the second transistor, a second line configured to supply a potential for turning off the third transistor that is a common potential also used as the potential for turning off the second transistor, and an isolator connected to the first line and the second line.

19 Claims, 12 Drawing Sheets

US 11,832,010 B2

CONVERSION APPARATUS, APPARATUS, AND SUBSTRATE

BACKGROUND

Technical Field

The aspect of the embodiments relates to a photoelectric conversion apparatus, an apparatus, and a substrate.

Description of the Related Art

There are known photoelectric conversion apparatuses including pixels each equipped with a photoelectric conversion unit. Japanese Patent Application Laid-Open No. 2011-254544 discusses that control signals for turning off a plurality of transistors included in a pixel are generated by a common voltage generation circuit (a negative voltage generation circuit 19).

In the case where a common voltage is used to generate the signals for turning off the plurality of transistors, a potential change in a signal line propagates to another circuit via the common voltage. This leads to the deterioration of the accuracy of a signal output from the photoelectric conversion apparatus.

SUMMARY

According to an aspect of the embodiments, a conversion apparatus includes a conversion unit, a first transistor configured to receive a charge in the conversion unit at a gate thereof, a second transistor connected to the gate, a signal line configured such that a signal is output from the first transistor thereto, a third transistor provided in a path between the signal line and the first transistor, a first line configured to supply a potential for turning off the second transistor, a second line configured to supply a potential for turning off the third transistor that is a common potential also used as the potential for turning off the second transistor, and an isolator connected to the first line and the second line.

Further features of the disclosure will become apparent from the following description of exemplary embodiments with reference to the attached drawings.

DESCRIPTION OF THE EMBODIMENTS

In the following description, each of exemplary embodiments will be described with reference to the drawings.

In each of the exemplary embodiments that will be described below, an imaging apparatus will be mainly described as an example of a photoelectric conversion apparatus. However, each of the exemplary embodiments is not limited to the imaging apparatus, and can also be applied to other examples of the photoelectric conversion apparatus. The other examples include a ranging apparatus (an apparatus for, for example, focus detection or measurement of a distance using Time of Flight (TOF)), and a light metering apparatus (an apparatus for, for example, measurement of a quantity of incident light).

The conductivity types of transistors that will be described in the following exemplary embodiments are examples, and the conductivity types of the transistors are not limited only to the conductivity types that will be described in the exemplary embodiments. The conductivity types that will be described in the exemplary embodiments can be changed as appropriate, and the potentials of gates, sources, and drains of the transistors are changed as appropriate according to this change.

For example, for a transistor intended to be used as a switch, it is possible to obtain the target configuration by inverting the low level and the high level of the potential supplied to the gate thereof in the descriptions of the exemplary embodiments according to the change in the conductivity type. Further, the conductivity types of semiconductor regions that will be described in the following exemplary embodiments are also examples, and the conductivity types of the semiconductor regions are not limited only to the conductivity types that will be described in the exemplary embodiments. The conductivity types that will be described in the exemplary embodiments can be changed as appropriate, and the potentials of the semiconductor regions are changed as appropriate according to this change.

Figure 1:
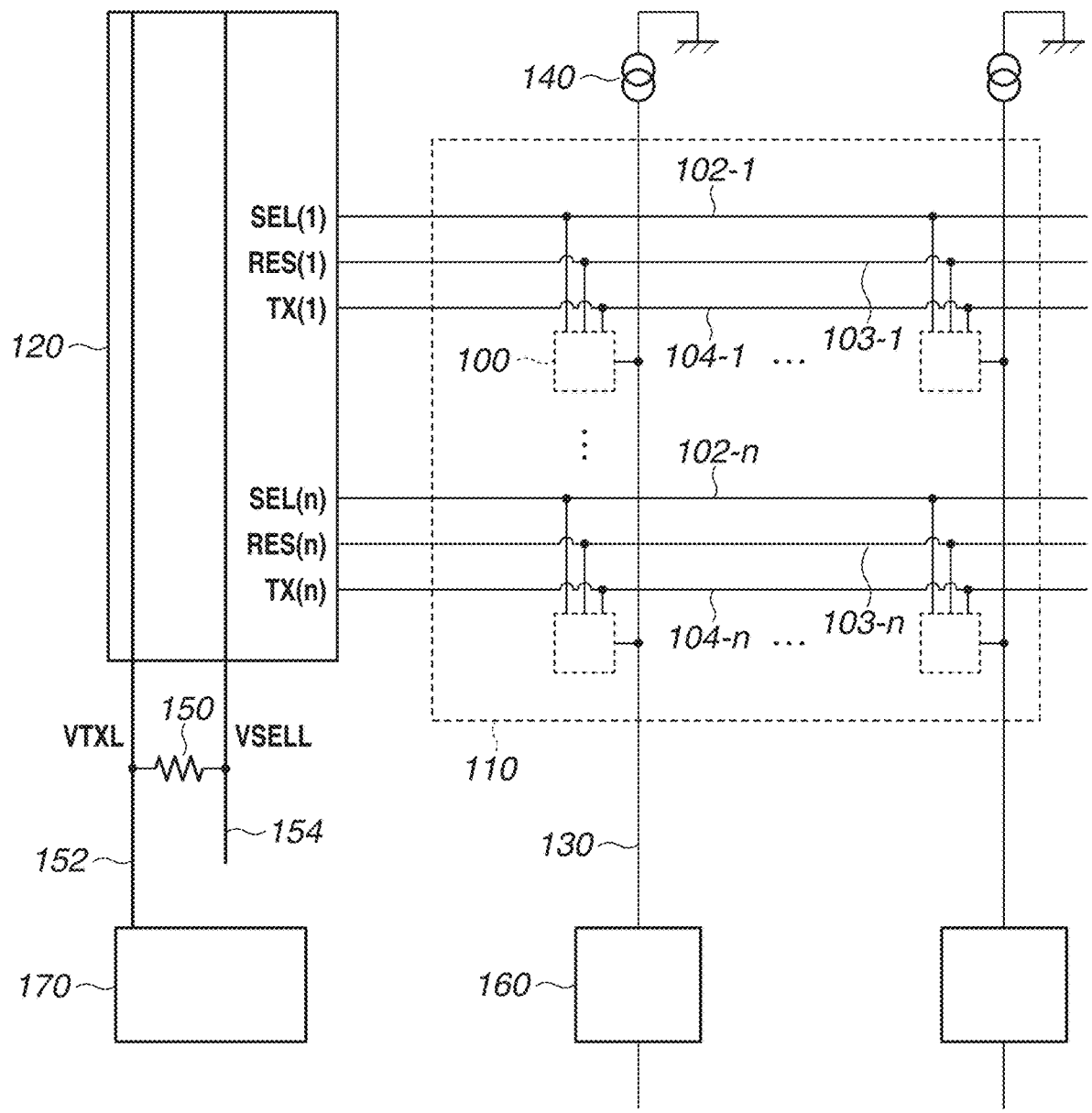
FIG. 1 illustrates the configuration of a photoelectric conversion apparatus.
Figure 2:
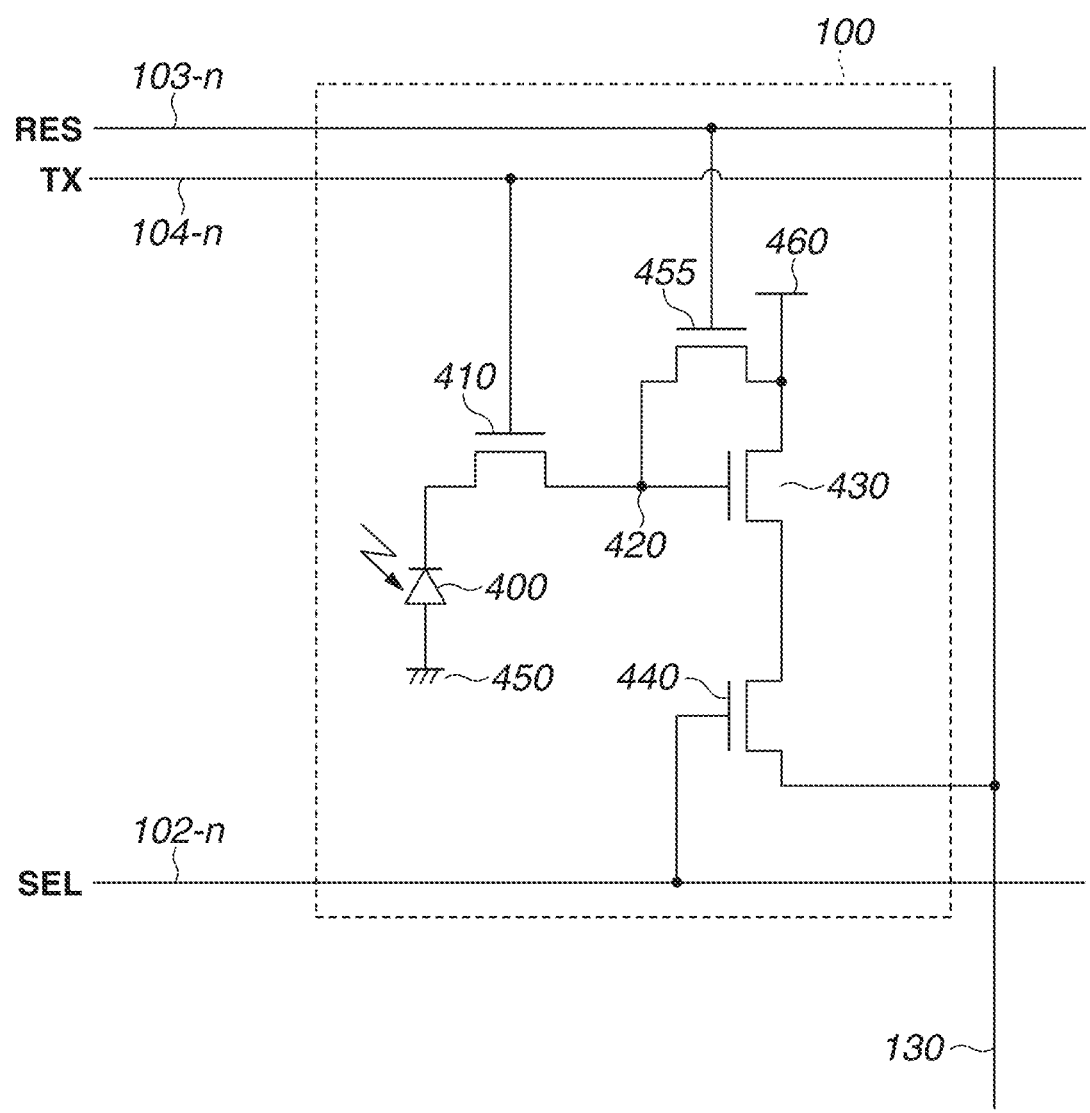
FIG. 2 illustrates the configuration of a pixel.
Figure 3:
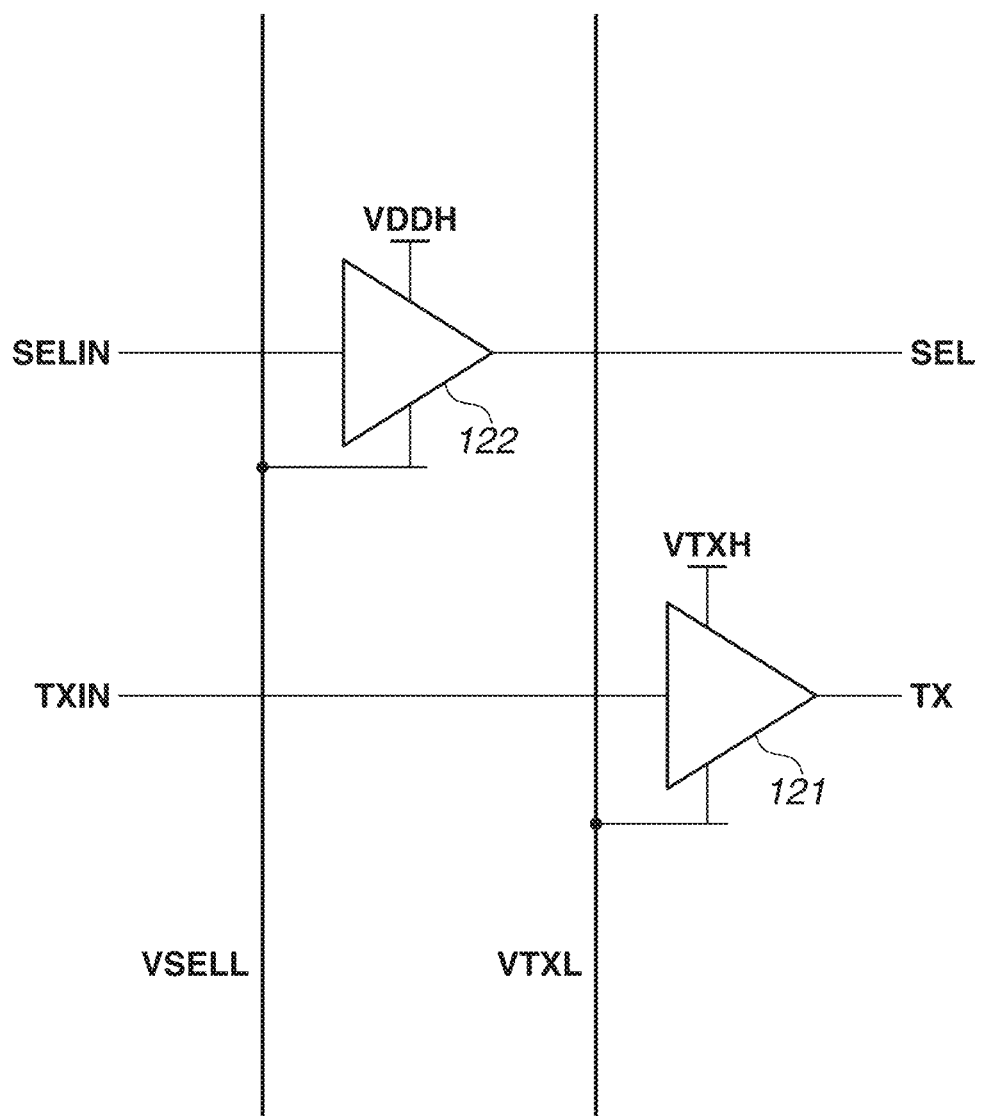
FIG. 3 illustrates the configuration of a vertical scanning circuit.
Figure 4:
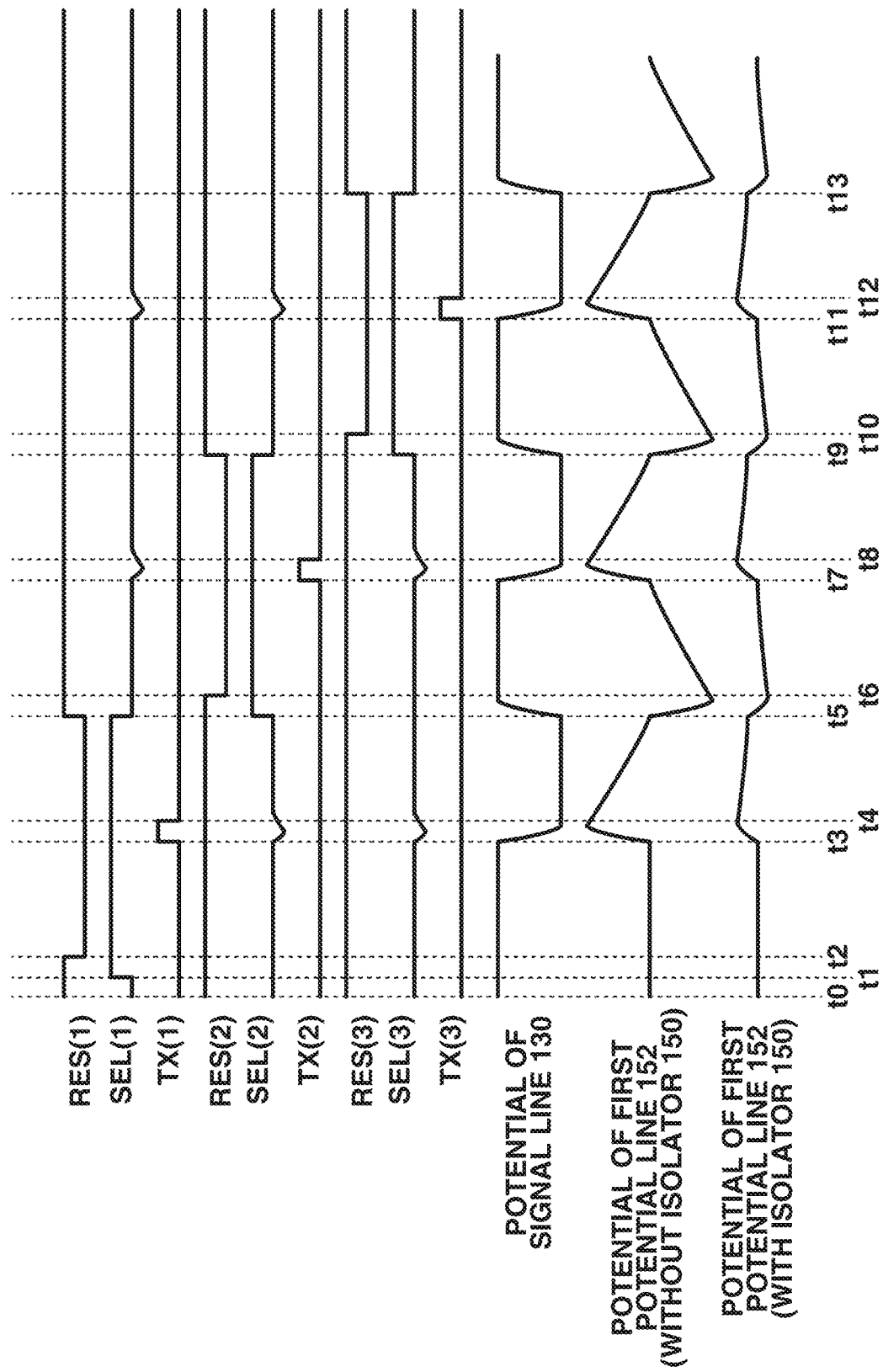
FIG. 4 illustrates the operation of the photoelectric conversion apparatus.

FIGS. 1, 2, and 3 are schematic views of an imaging apparatus, which is a photoelectric conversion apparatus according to a first exemplary embodiment, and FIG. 4 is a timing chart thereof.

FIG. 1 illustrates the configuration of the imaging apparatus. The imaging apparatus includes a pixel array 110 in which pixels 100 are arranged across a plurality of rows and a plurality of columns. The imaging apparatus includes a vertical scanning circuit 120, which scans the pixel array 110 row by row. Further, the imaging apparatus includes signal lines 130, current sources 140, and an isolator (a resistive element) 150. Further, the imaging apparatus includes signal processing circuits 160 and a negative voltage supply circuit (a potential supply unit) 170. A first potential line 152 is connected to the negative voltage supply circuit 170. The negative voltage supply circuit 170 is not limited to this example as long as it has at least a function of supplying a negative voltage, and may further have a function of generating a negative voltage. For example, a negative voltage may be generated outside the photoelectric conversion apparatus, and the negative voltage supply circuit 170 may be a circuit that buffers the negative voltage supplied from outside. A second potential line 154 is connected to this first potential line 152 via the isolator 150. These first potential line 152 and second potential line 154 are connected to the vertical scanning circuit 120. As will be described below, the first potential line 152 is a wiring that supplies a potential VTXL of a signal for turning off a transfer transistor. Further, the second potential line 154 is a wiring that supplies a potential VSELL of a signal for turning off a selection transistor, which will be described below. The potentials VTXL and VSELL are the same potential.

The vertical scanning circuit 120 is connected to the pixels 100 in the pixel array 110 via control lines laid row by row. Control lines 102-n, 103-n, and 104-n are laid for the pixels 100 in an n-th row (n is a natural number). The control line 102-n transmits a signal SEL(n). The control line 103-n transmits a signal RES(n). The control line 104-n transmits a signal TX(n).

The imaging apparatus can be a non-lamination type imaging apparatus in which the configuration illustrated in FIG. 1 is entirely contained in one substrate (typically, a semiconductor substrate, but may be a substrate different from the semiconductor substrate, such as a glass substrate). Like a second exemplary embodiment that will be described below, the imaging apparatus may be a lamination type imaging apparatus in which a plurality of substrates (typically, semiconductor substrates, but may be substrates different from the semiconductor substrates, such as glass substrates) is laminated.

FIG. 2 illustrates an example of the configuration of the pixel 100. The pixel 100 includes a photodiode 400, which is an example of a photoelectric conversion unit, a transfer transistor 410, a floating diffusion (hereinafter referred to as an FD) 420, a source follower transistor 430, and a selection transistor 440. The transfer transistor 410 transfers a charge generated from a photoelectric conversion in the photodiode 400 to the FD 420. The source follower transistor 430 outputs a signal based on a potential of the FD 420 to the selection transistor 440. The selection transistor 440 outputs the signal output from the source follower transistor 430 to the signal line 130.

A gate of a reset transistor 455 is connected to the control line 103-n. A gate of the transfer transistor 410 is connected to the control line 104-n. A gate of the selection transistor 440 is connected to the signal line 102-n.

An anode of the photodiode 400 is connected to a ground (GND) node 450. Further, the source follower transistor 430 and the reset transistor 455 are connected to a power source node 460. The transistors included in the pixel 100 will be described here assuming that they are negative (N) type transistors. In this case, typically, a power source voltage of 1 to 6 V is input to the power source node 460. The GND node 450 can be at a ground potential, but is not limited to this potential and can also be at a negative potential. The transistors included in the pixel 100 may be positive (P) type transistors. The configuration in this case can be constructed by inverting the magnitude relationship between the potentials of the power source node 460 and the GND node 450.

The source follower transistor 430 is an example of a first transistor that receives the signal charge of the photodiode 400 at the gate thereof. The transfer transistor 410 is a transistor provided in an electric path between the photodiode 400 and the source follower transistor 430. Further, the transfer transistor 410 is an example of a second transistor connected to the gate of the source follower transistor 430. The selection transistor 440 is an example of a third transistor provided in an electric path between the source follower transistor 430 and the signal line 130.

FIG. 3 illustrates an example of a unit circuit for one row in the vertical scanning circuit 120. The unit circuit for one row in the vertical scanning circuit 120 includes buffers 121 and 122. The potential VTXL and a potential VTXH are supplied to the gate of the transfer transistor 410 via the buffer 121 and the control line 104-n. The potential VTXL is a low level of the gate of the transfer transistor 410 and the potential VTXH is a high level of the gate of the transfer transistor 410. The transistors in the pixel 100 are N-type transistors. Therefore, the transistors are turned off with a low-level signal applied to the gates thereof, and are turned on with a high-level signal applied to the gates thereof.

The potential VSELL and a potential VDDH are supplied to the gate of the selection transistor 440 via the buffer 122 and the control line 102-n. The potential VSELL is a low level of the gate of the selection transistor 440 and the potential VDDH is a high level of the gate of the selection transistor 440.

In FIG. 1, when all of signals TX(1) to TX(n) are at the low level, the potential VTXL is supplied to each of the transfer resistors 410 of all the pixels 100 in the pixel array 110 via the vertical scanning circuit 120. The potential VTXL is connected to the negative voltage supply circuit 170.

Further, when all of signals SEL(1) to SEL(n) are at the low level, the potential VSELL is supplied to each of the selection resistors 440 of all the pixels 100 in the pixel array 110 via the vertical scanning circuit 120. The second potential line 154 and the first potential line 152, which supply this potential VSELL and the potential VTXL to the vertical scanning circuit 120, respectively, are connected to each other via the isolator 150.

As will be described in detail below with reference to FIG. 4, a potential change in the signal line 130 propagates to the control line 102-n via capacitive coupling between the signal line 130 and the gate of the selection transistor 440. This change in the potential of the control line 102-n propagates to the second potential line 154, which transmits the potential VSELL. In a case where the isolator 150 is not provided, the potential change in the second potential line 154 propagates to the first potential line 152. As a result, the potential of the potential VTXL changes. This change in the potential of the potential VTXL propagates to the control line 104-n. As a result, the potential change propagates to the FD 420 of the pixel 100 in which the transfer transistor 410 with the potential VTXL supplied thereto is in an OFF state due to capacitive coupling between the control line 104-n and the FD 420. This results in the deterioration of the accuracy of the signal output from the pixel 100. In other words, the change in the potential of the signal line 130 causes a potential change in the FD 420 of the pixel 100 with the transfer transistor 410 thereof in the OFF state, and leads to the deterioration of the accuracy of the signal of this pixel 100. In the present disclosure, the isolator 150 is provided in the electric path between the second potential line 154 and the first potential line 152. This configuration impedes the occurrence of the potential change in the FD 420 of the pixel 100 with the transfer transistor 410 thereof in the OFF state due to the change in the potential of the signal line 130. As a result, the deterioration of the accuracy of the signal of the pixel 100 can be prevented or reduced.

In FIG. 2, a signal charge generated in the photodiode 400 is transferred to the FD 420 due to turn-on of the transfer transistor 410. The transferred signal charge is converted into a signal voltage using a parasitic capacitance accompanying the FD 420. Then, this signal voltage is output to the signal line 130 via the source follower transistor 430 and the selection transistor 440.

The source follower transistor 430 forms a source follower circuit together with the current source 140 illustrated in FIG. 1. Due to this source follower circuit, the signal voltage of the FD 420 is buffered in this source follower circuit and output to the signal line 130. Then, the signal voltage is read out to a further subsequent stage by the signal processing circuit 160.

Further, the operation will be described with reference to the timing chart in FIG. 4. FIG. 4 illustrates the operation regarding the pixels 100 corresponding to three rows, the first row, the second row, and the third row as an example. In FIG. 4, the signals SEL(1) to SEL(3) are input to the gates of the selection transistors 440 of the pixels 100 in the first to third rows in FIG. 1, respectively. The signals RES(1) to RES(3) are input to the gates of the reset transistors 455 of the pixels 100 in the first to third rows in FIG. 1, respectively. Similarly, the signals TX(1) to TX(3) are input to the gates of the transfer transistors 410 of the pixels 100 in the first to third rows in FIG. 1, respectively.

The potential of the signal line 130 in a column where the signal is sequentially output from the pixel 100 on which light is incident is indicated as the potential of the signal line 130. The potential of the first potential line 152 is indicated in comparison between when the isolator 150 is provided and when the isolator 150 is not provided as a comparison example.

At time t0, the signal RES(1) is set at the high level, and the potential of the FD 420 of the pixel 100 in the first row is reset.

At time t1, the signal SEL(1) is switched to the high level, and the pixel 100 in the first row is selected. On the other hand, the signals SEL(2) and SEL(3) are kept at the low level, and therefore the pixels 100 in the second row and the third row are kept in a non-selected state.

At time t2, the signal RES(1) is switched to the low level, and the reset of the FD 420 of the pixel 100 in the first row is cleared.

During a period from time t3 to time t4, the signal TX(1) is switched to the high level, and the signal is output to the signal line 130 via the selection transistor 440 to which the signal SEL(1) is input. Therefore, the potential of the signal line 130 reduces during the period from time t3 to time t4. Further, ideally, the signals SEL(2) and SEL(3) at the low level do not change during this period from time t3 to time t4. However, actually, the capacitive coupling occurs from the signal line 130 to the control line 102-*n* of each of all of non-selected rows including the signals SEL(2) and SEL(3). As a result, a current flows to the control line 102-*n* and the potential of the control line 102-*n* changes. This potential change in the control line 102-*n* in each of the non-selected rows propagates to the second potential line 154. At this time, the potential change in the control line 102-*n* of each one of the non-selected lines is supposed to be summed up and propagate to the second potential line 154. In the case where the isolator 150 is not provided, this change in the potential of the second potential line 154 is supposed to cause a change in the potential of the first potential line 152. This potential change in the first potential line 152 causes a change in the potential VTXL, and causes a change in the potential of the control line 104-*n*. This potential change in the control line 104-*n* causes a change in the potential of the FD 420 in the selected line due to the capacitive coupling between the control line 104-*n* and the FD 420. As a result, the accuracy of the signal output from the pixel 100 in the selected line is deteriorated. In a case where an image is generated using the signal output from the photoelectric conversion apparatus, the image quality thereof is impaired.

At time t5, the signal RES(1) is switched to the high level, and the charge of the FD 420 of the pixel 100 in the first line is reset. At time t5, the potential of the signal line 130 increases and returns to a voltage before the potential reduces.

Further, at the same timing, time t5, the signal SEL(2) is switched to the high level and the pixel 100 in the second line is selected. On the other hand, at time t5, the signal SEL(1) is switched to the low level, and the signal SEL(3) is continuously kept at the low level. Therefore, the pixels 100 in the first row and the third row are at the non-selected state.

At time t6, the signal RES(2) is switched to the low level, and the reset of the FD 420 of the pixel 100 in the second row is cleared.

The signal TX(2) is switched to the high level during a period from time t7 to time t8, and the signal is output to the signal line 130 via the selection transistor 440 to which the signal SEL(2) is input. As a result, the potential of the signal line 130 reduces. During this period from time t7 to time t8, a change similar to the change during the period from time t3 to time t4 also occurs in the signals SEL(1) and SEL(3) in the non-selected rows. Therefore, a potential change occurs in the FD 420 in the selected row.

Similarly, the pixel 100 in the third row is selected and the pixels 100 in the first row and the second row are at the non-selected state since time t9, and the signal TX(3) is switched to the high level during a period from time t11 to time t12, as a result of which the potential of the signal line 130 reduces. Then, a change similar to the changes during the period from time t3 and time t4 and the period from time t7 to time t8 occurs in the signals SEL(1) and SEL(2) in the non-selected rows. Therefore, a potential change occurs in the FD 420 in the selected row.

For the fourth line and lines subsequent thereto, a potential change similarly occurs in the FD 420 in the selected line due to the potential change in the control line 102-*n* in the non-selected line with respect to any n-th line. In the case where the isolator 150 is not provided, a large potential change occurs in the potential VTXL of the first potential line 152, as illustrated in FIG. 4.

In the present exemplary embodiment, the isolator 150 is provided between the first potential line 152 and the second potential line 154. Due to this provision, the photoelectric conversion apparatus can prevent or reduce the propagation of the potential change from the second potential line 154 to the first potential line 152. Accordingly, the change in the signal VTXL is prevented or reduced. As a result, the photoelectric conversion apparatus can prevent or reduce the potential change in the FD 420 in the selected line.

Use of a too low value as the resistance value of the isolator 150 leads to a reduction in the effect of preventing or reducing the potential change in the first potential line 152. On the other hand, use of a too high value as the resistance value of the isolator 150 leads to impeding the current supply to the second potential line 154 although the change in the potential of the first potential line 152 can be prevented or reduced. As a result, the change in the potential VSELL increases. In consideration thereof, in one embodiment, a resistance value of the isolator 150 can be set within a range of 10Ω or higher and 1000Ω or lower.

Especially, in one embodiment, the resistance value of the isolator 150 is set within a range of 60Ω or higher and 150Ω or lower because this range can achieve both the voltage supply from the first potential line 152 to the second potential line 154 and the prevention or reduction of the propagation of the potential change at a high level. Further, in a case where resistance of 10Ω or higher is generated using parasitic resistance of the wiring, the wiring area increases and therefore constraints are imposed on the wiring layout. Therefore, in one embodiment, a resistive element including polysilicon or diffusion resistance including a diffusion region in which an impurity is diffused in the semiconductor substrate is used, as the isolator 150.

The pixel structure described in the present exemplary embodiment is not limited to the configuration illustrated in FIG. 2. For example, this pixel structure can also be applied to a pixel having a global shutter function illustrated in FIG. 11. The pixel 100 illustrated in FIG. 11 includes a shutter transistor 490 and a holding capacitor 480 (a holding unit) between the transfer transistor 410 and the photodiode 400. A signal GS is supplied from the vertical scanning circuit 120 to a gate of this shutter transistor 490. The signal GS is changed to a high level or a low level for each of the pixels 100 in all the rows in the pixel array 110 at the same time.

Therefore, when the signal GS is changed to the high level, the signal charge is transferred from the photodiode 400 of each of all the pixels 100 in the pixel array 110 to the corresponding holding capacitor 480. In other words, a global shutter operation can be performed. The pixel 100 illustrated in FIG. 11 has this global shutter function.

In this configuration, the transfer transistor 410 is connected to the holding capacitor 480, which is the holding unit that holds the charge of the photodiode 400, and the gate of the source follower transistor 430. Further, the transfer transistor 410 can also be said to be connected to the photodiode 400 in this configuration. Further, in this configuration, the photoelectric conversion apparatus may be configured in such a manner that a voltage for turning off the shutter transistor 490 (may be a negative voltage), which is supplied to the gate of the shutter transistor 490, is generated from a potential line connected to the second potential line 154 via an isolator. Further, a transistor for discharging the charge may be further connected to the photodiode 400 in the configuration illustrated in FIG. 11. The photoelectric conversion apparatus may be configured in such a manner that a voltage for turning off the transistor for discharging the charge (may be a negative voltage), which is supplied to a gate of this transistor for discharging the charge, is generated from a potential line connected to the second potential line 154 via an isolator.

Figure 11:
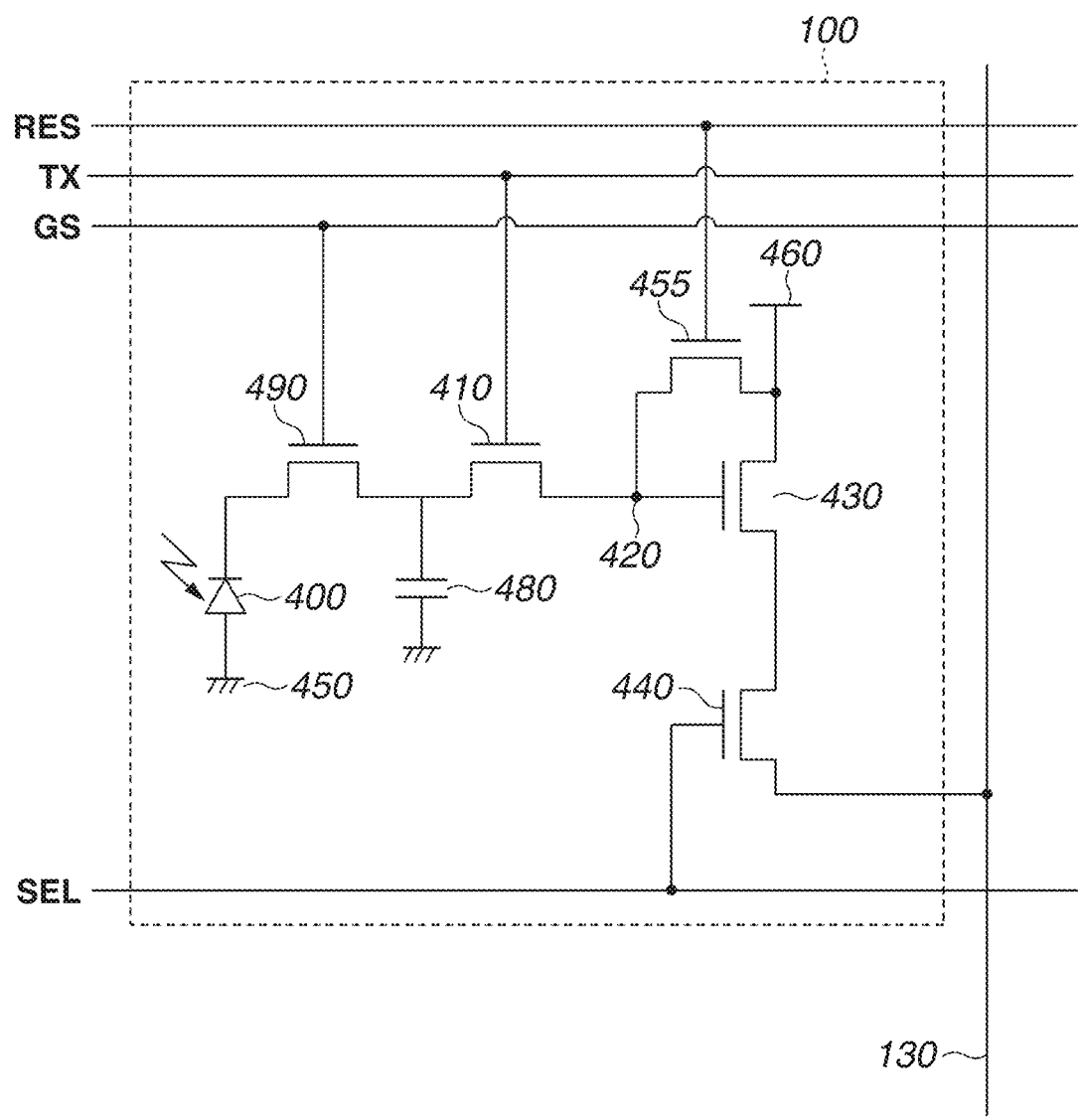
FIG. 11 illustrates the configuration of a pixel.

Further, a transistor for changing a capacitance value that is connected to the FD 420 may be further provided to the configuration of the pixel 100 illustrated in FIG. 2 or the configuration of the pixel 100 illustrated in FIG. 11. An additional capacitor is connected to the FD 420 according to turn-on of this transistor. This additional capacitor may be prepared by using capacitance of a channel portion of the transistor or providing a capacitive element (a metal-insulator-metal (MIM) capacitor, a metal-oxide-semiconductor (MOS) capacitor, or the like) separately from the transistor. Due to this configuration, the photoelectric conversion apparatus can reduce a charge-voltage conversion coefficient, based on which the signal charge is converted into the voltage, with the aid of a combined capacitor of the FD 420 and the additional capacitor. The photoelectric conversion apparatus may be configured in such a manner that a voltage for turning off this transistor (may be a negative voltage), which is supplied to a gate of the transistor for changing this capacitance value, is generated from a potential line connected to the second potential line 154 via an isolator. Even this configuration can achieve similar beneficial effects to the present exemplary embodiment.

In the pixel 100, similarly, the potential change in the signal line 130 also causes a potential change in the FD 420 of the pixel 100 in the selected line. Therefore, due to the provision of the isolator 150, the photoelectric conversion apparatus can prevent or reduce the deterioration of the accuracy of the signal of the pixel 100 in the selected line.

Further, the present exemplary embodiment has been described referring to the example in which one pixel 100 includes one photodiode 400, but is not limited to this example. The photoelectric conversion apparatus may be configured in such a manner that one pixel 100 includes a plurality of photodiodes. In this case, focus detection (ranging) based on the image plane phase-difference method can be conducted by configuring the photoelectric conversion apparatus so as to include a plurality of photodiodes for one microlens.

Further, in the case where the plurality of photodiodes is provided, the photoelectric conversion apparatus can be configured in such a manner that charges of the plurality of photodiodes are input to one FD 420. In this case, the pixel 100 is provided with a plurality of transfer transistors so as to correspond to the plurality of photodiodes, respectively, but includes only one reset transistor and one source follower transistor. Further, as another example, the photoelectric conversion apparatus may be configured in such a manner that a plurality of FDs 420 is provided in one pixel, and a charge of a part of the plurality of photodiodes is input to a part of the FDs 420, and a charge of another photodiode is input to another FD 420. In this case, a plurality of transistors is provided in one pixel 100 as each of the reset transistor and the source follower transistor. The number of selection transistors may be changed according to the number of photodiodes, or may be changed according to the number of signal lines 130 provided in correspondence with the pixels 100 in one column. For example, in a case where two signal lines 130 are provided to the pixels 100 in one column, the pixel 100 may be configured to include a plurality of selection transistors 440 for one source follower transistor 430. One of this plurality of selection transistors 440 is connected one of the two signal lines 130, and the other selection transistor 440 is connected to the other signal line 130. This allows the signal line to which the pixel 100 outputs the signal to be switched as appropriate according to the operation mode of the imaging apparatus.

Further, the resistive element is used as an example of the isolator 150 in the present exemplary embodiment, but the isolator 150 is not limited to this example. In the present exemplary embodiment, the photoelectric conversion apparatus is configured in such a manner that a common potential is supplied from the first potential line 152 to the second potential line 154 using the voltage supply via the isolator 150. The photoelectric conversion apparatus may be configured in such a manner that the negative voltage supply circuit 170 supplies the potential to the second potential line 154 without the intervention of the first potential line 152, and a capacitive element can also be used as the isolator 150 in this case.

Further, the present exemplary embodiment has been described referring to the example in which the potentials VTXL and VSELL are negative potentials, but the potentials VTXL and VSELL are not limited to this example and may be a ground potential or a positive potential. Further, the present exemplary embodiment has been described citing the example in which the potentials VTXL and VSELL are the same potential, but the potentials VTXL and VSELL may be unable to become completely the same potential due to the operation of the photoelectric conversion apparatus or the resistance value of the isolator 150. The potentials VTXL and VSELL even including such a case can be handled as the common potential.

A second exemplary embodiment will be described, focusing on differences from the first exemplary embodiment.

Figure 5:
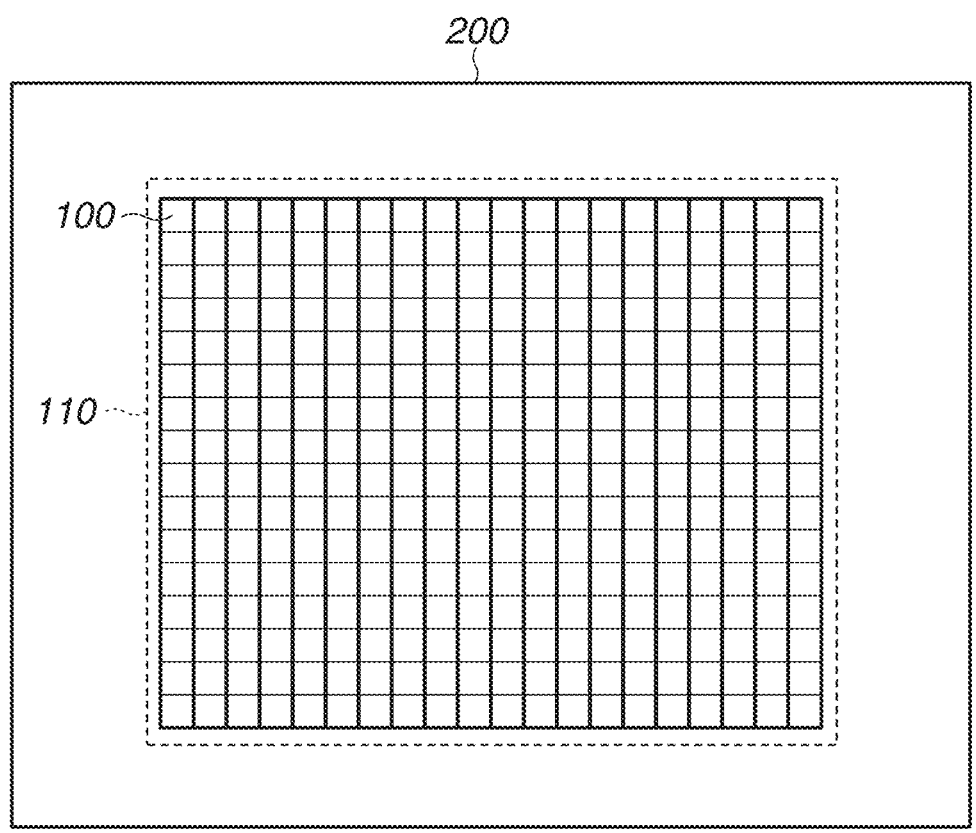
FIG. 5 illustrates the configuration of a photoelectric conversion apparatus.
Figure 6:
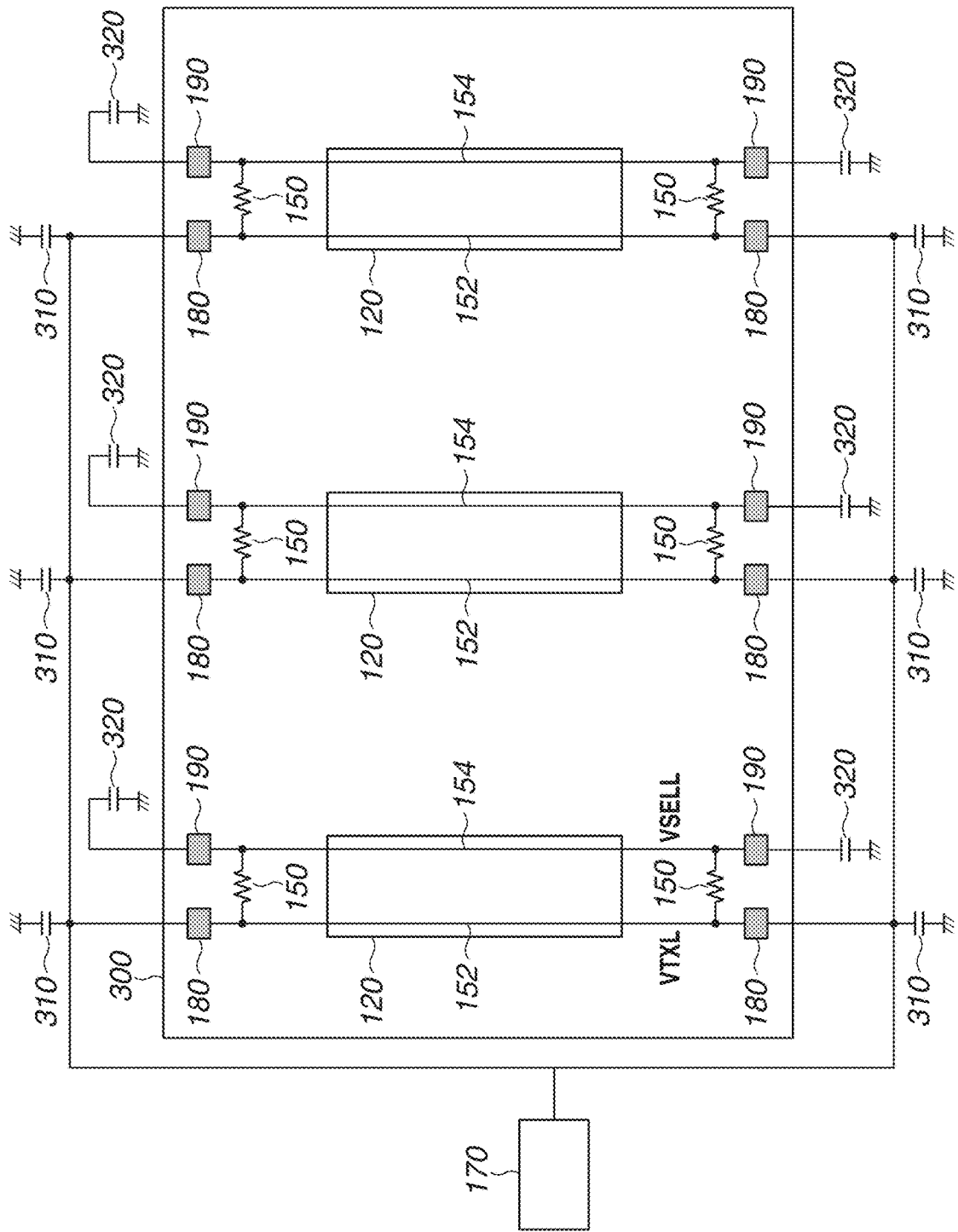
FIG. 6 illustrates the configuration of a photoelectric conversion apparatus.

FIGS. 5 and 6 illustrate schematic views of an imaging apparatus according to the second exemplary embodiment. In the following description, the second exemplary embodiment will be described, focusing on differences from the first exemplary embodiment.

The present exemplary embodiment relates to an imaging apparatus in which a plurality of substrates is laminated.

In FIG. 5, the pixel array 110 is disposed on a first substrate 200.

In FIG. 6, vertical scanning circuits 120, isolators 150, power source pads 180, to which the signal VTXL is input, and power source pads 190, to which the signal VSELL is input, are disposed on a second substrate 300. In the present exemplary embodiment, each of the isolators 150, the power source pads 180, and the power source pads 190 are disposed at six portions. The isolators 150 are each disposed between the vertical scanning circuit 120 and the power source pads 180 and 190. The negative voltage supply circuit 170 is connected outside the second substrate 300 via the power source pad 180. As another example, the negative voltage supply circuit 170 may be disposed on the second substrate 300. A bypass capacitor 310 is connected between the power source pad 180 and a ground potential node (hereinafter may be referred to as a GND). A bypass capacitor 320 is connected between the power source pad 190 and a GND. The first substrate 200 and the second substrate 300 are bonded together in such a manner that the pixel array 110 and the signals SEL(1) to SEL(n), RES(1) to RES(n), and TX(1) to TX(n) of the vertical scanning circuits 120 are connected to each other. The first substrate 200 and the second substrate 300 are bonded together in such a manner that the first substrate 200 is located on the upper side and the second substrate 300 is located on the lower side as viewed from a light incident surface. These first substrate 200 and second substrate 300 are electrically connected to each other. This electric connection can be established with the aid of a Through Silicon Via (TSV) structure. Alternatively, as another connection method, the electric connection can also be established by hybrid bounding, in which insulating films are provided and conductive members are provided in trenches of the insulating films on the respective bonded surfaces of the first substrate 200 and the second substrate 300, and the insulating films are joined to each other and the conductive members are joined to each other. The electric connection between the plurality of substrates is not limited to these methods, and the photoelectric conversion apparatus may be configured to employ a micro-bump and can employ various connection methods. Then, the potential VTXL is input from outside the imaging apparatus via the power source pad 180 at each of the six portions. Further, the bypass capacitor 310 is disposed between the power source pad 180 and the GND. Due to this configuration, the change in the potential VTXL can be further prevented or reduced compared to when the power source pad 180 is provided at one portion or the bypass capacitor 310 is not provided. Further, the input of the potential VSELL via the isolator 150 at each of the six locations allows the VSELL potential to be kept even in the surface of the second substrate 300 and the degradation of the image quality to be prevented or reduced compared to when the isolator 150 is provided at one portion. Further, the provision of the bypass capacitor 320 between the power source pad 190 and the GND allows the change in the potential VSELL to be also prevented or reduced due to the provision of the isolator 150.

The present exemplary embodiment has been described referring to the configuration in which the two substrates are laminated, but is not limited to this number of substrates and may be configured in such a manner that a further larger number of substrates are laminated.

A third exemplary embodiment will be described, focusing on differences from the first exemplary embodiment.

The first exemplary embodiment is directed to preventing or reducing the potential change in the FD derived from the control line connected to the gate of the transfer transistor. The present exemplary embodiment is directed to preventing or reducing a potential change in the FD derived from the control line connected to the gate of the reset transistor.

Figure 7:
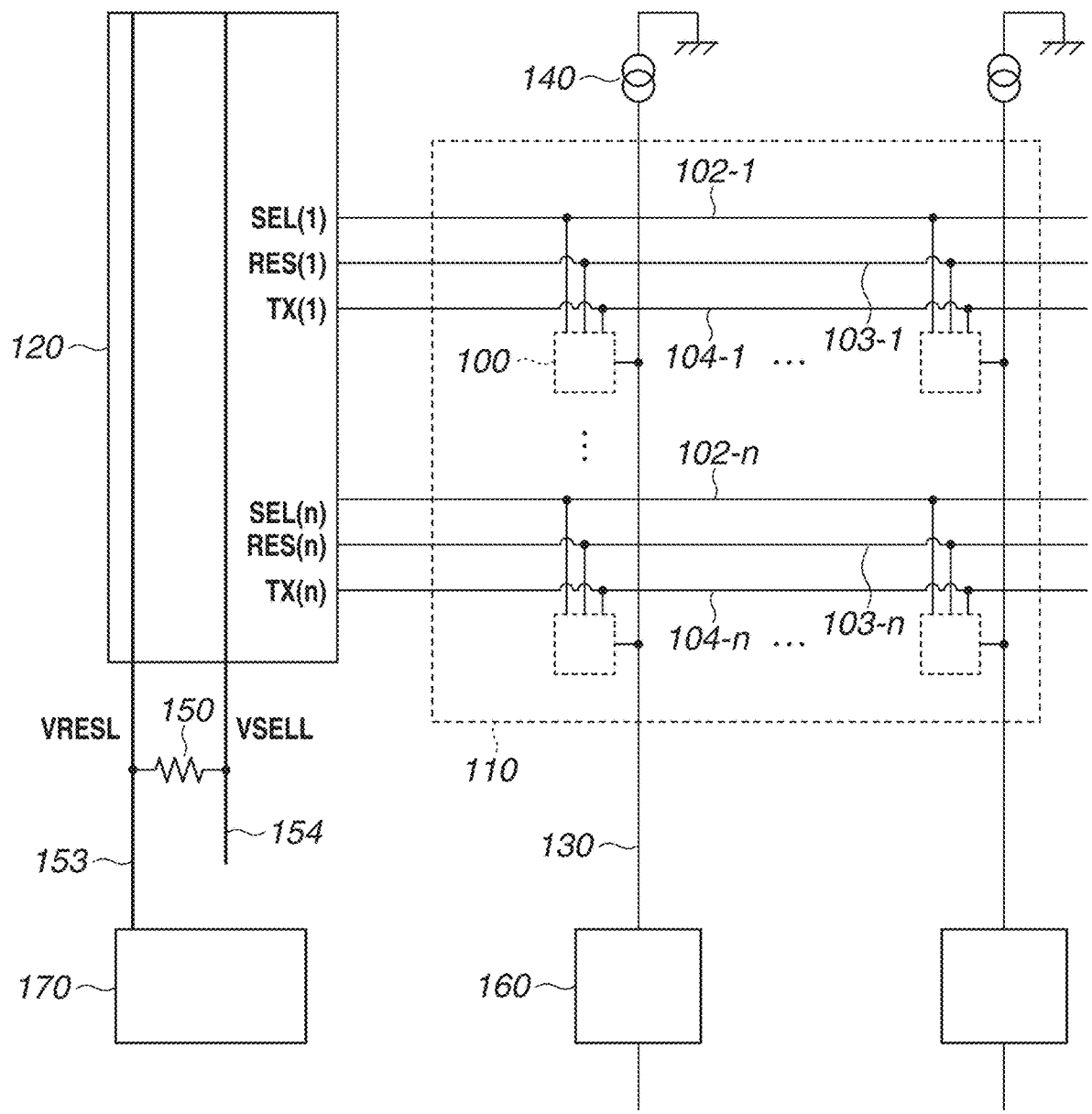
FIG. 7 illustrates the configuration of a photoelectric conversion apparatus.
Figure 8:
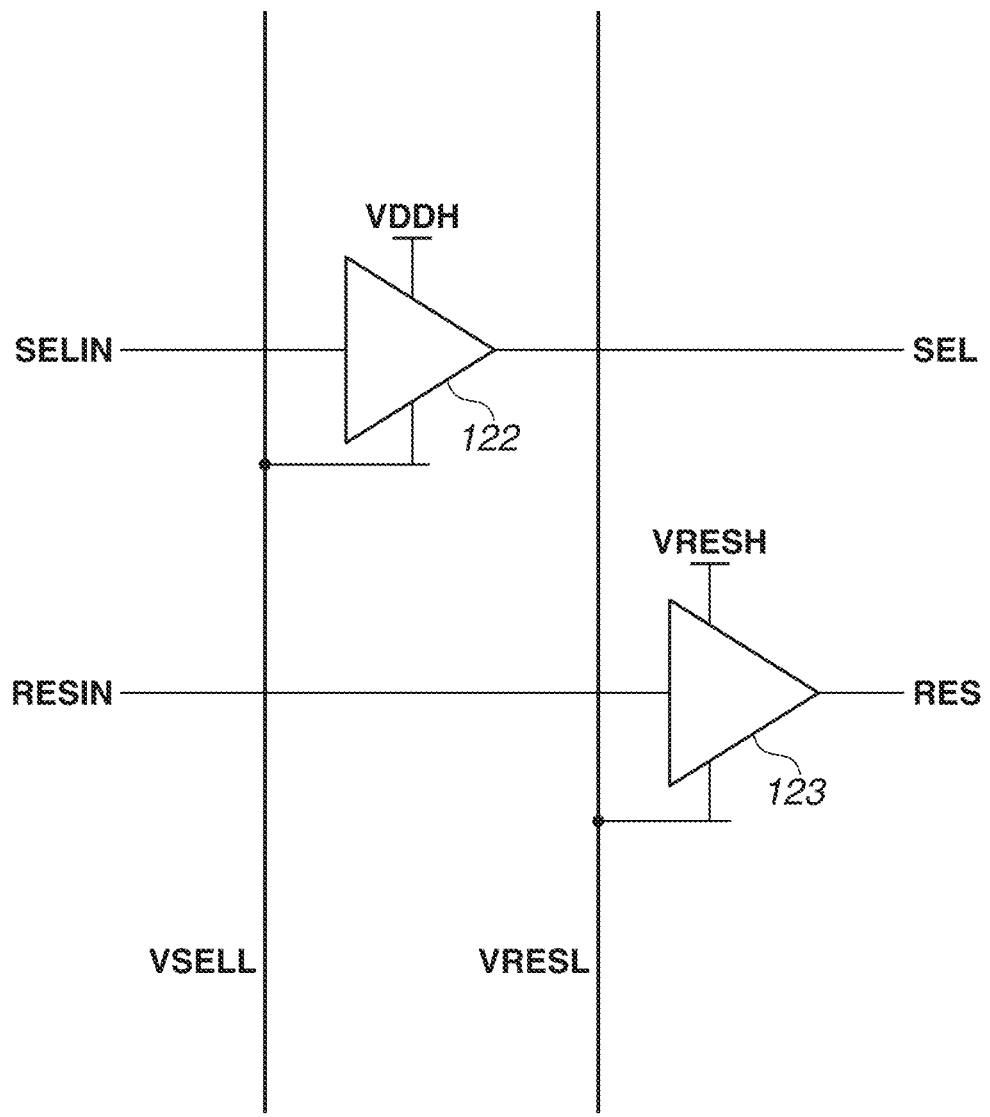
FIG. 8 illustrates the configuration of a vertical scanning circuit.

FIGS. 7 and 8 illustrate schematic views of an imaging apparatus according to the third exemplary embodiment. FIG. 7 is similar to FIG. 1 except for the potential VTXL in FIG. 1 replaced with a potential VRESL. The potential VRESL is a low-level potential supplied to the gate of the reset transistor 455 illustrated in FIG. 1. The potential VRESL is supplied to the gate of the reset transistor 455 to be set to OFF via the vertical scanning circuit 120 and the control line 103-n. The negative voltage supply circuit 170 supplies the potential VRESL to the vertical scanning circuit 120 via a third potential line 153. The potential VRESL is a potential that is the same as the potential VSELL.

FIG. 8 illustrates an example of a unit circuit for one row in the vertical scanning circuit 120, similarly to FIG. 3. The unit circuit for one row in the vertical scanning circuit 120 includes buffers 122 and 123. The configuration of the buffer 122 is similar to that of FIG. 3. The potential VRESL and a potential VRESH are connected to the gate of the reset transistor 455 via the buffer 123. The potential VRESL is a low-level potential supplied to the gate of the reset transistor 455. Further, the potential VRESH is a high-level potential supplied to the gate of the reset transistor 455.

In FIG. 7, the control line 103-n is connected to the third potential line 153 (another example of the first potential line) via the vertical scanning circuit 120. Further, the third potential line 153 is connected to the negative voltage supply circuit 170. Further, the control line 102-n is connected to the second potential line 154 via the vertical scanning circuit 120. The second potential line 154 and the third potential line 153 are connected to each other via the isolator 150. Due to this configuration, the photoelectric conversion apparatus can prevent or reduce the propagation of the potential changes in the signal line 130, the control line 102-n, and the second potential line 154 to the third potential line 153. In the case where the isolator 150 is not provided, the potential change in the third potential line 153 propagates to the control line 103-n. Then, a potential change occurs in the FD 420 of the pixel 100 in the selected line due to capacitive coupling between the control line 103-n and the FD 420. On the other hand, due to the provision of the isolator 150, the photoelectric conversion apparatus can prevent or reduce the potential change in the FD 420 of the pixel 100 in the selected line via the control line 103-n. As a result, the photoelectric conversion apparatus can prevent or reduce the deterioration of the accuracy of the signal output from the pixel 100 in the selected line.

Further, the present exemplary embodiment can be combined with the first exemplary embodiment. More specifically, as illustrated in FIG. 1, the second potential line 154 and the first potential line 152 are connected to each other via an isolator. Then, as illustrated in FIG. 7, the second potential line 154 and the third potential line 153 are connected to each other via another isolator. In other words, the present exemplary embodiment can be configured in such a manner that each of the first potential line 152 and the third potential line 153 is connected to the second potential line 154 via the isolator. This configuration can achieve both the beneficial effects of the first exemplary embodiment and the beneficial effects of the present exemplary embodiment, and can further contribute to preventing or reducing the deterioration of the accuracy of the signal of the pixel 100 in the selected line.

A fourth exemplary embodiment will be described, focusing on differences from the first exemplary embodiment.

Figure 9:
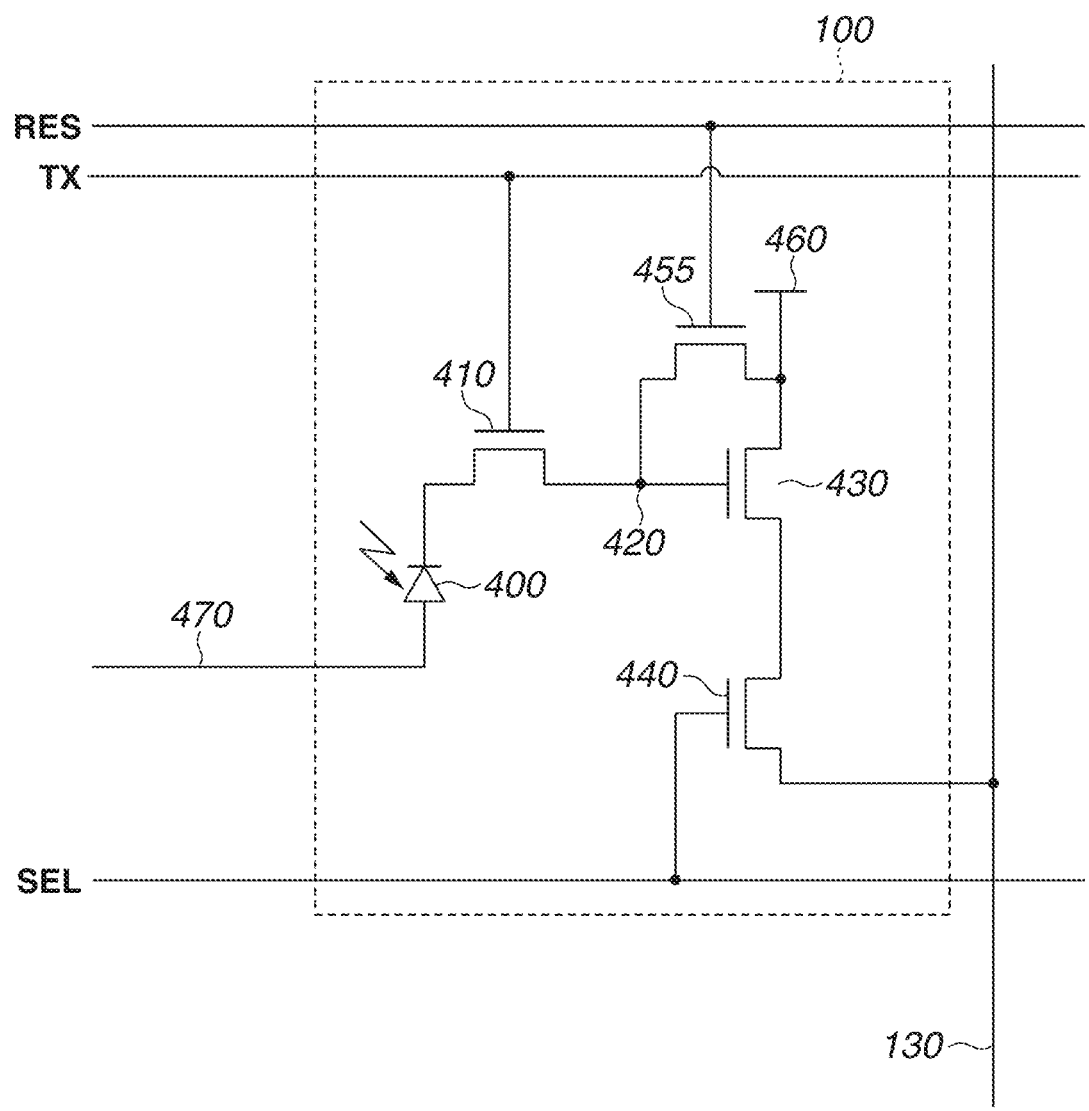
FIG. 9 illustrates the configuration of a pixel.
Figure 10:
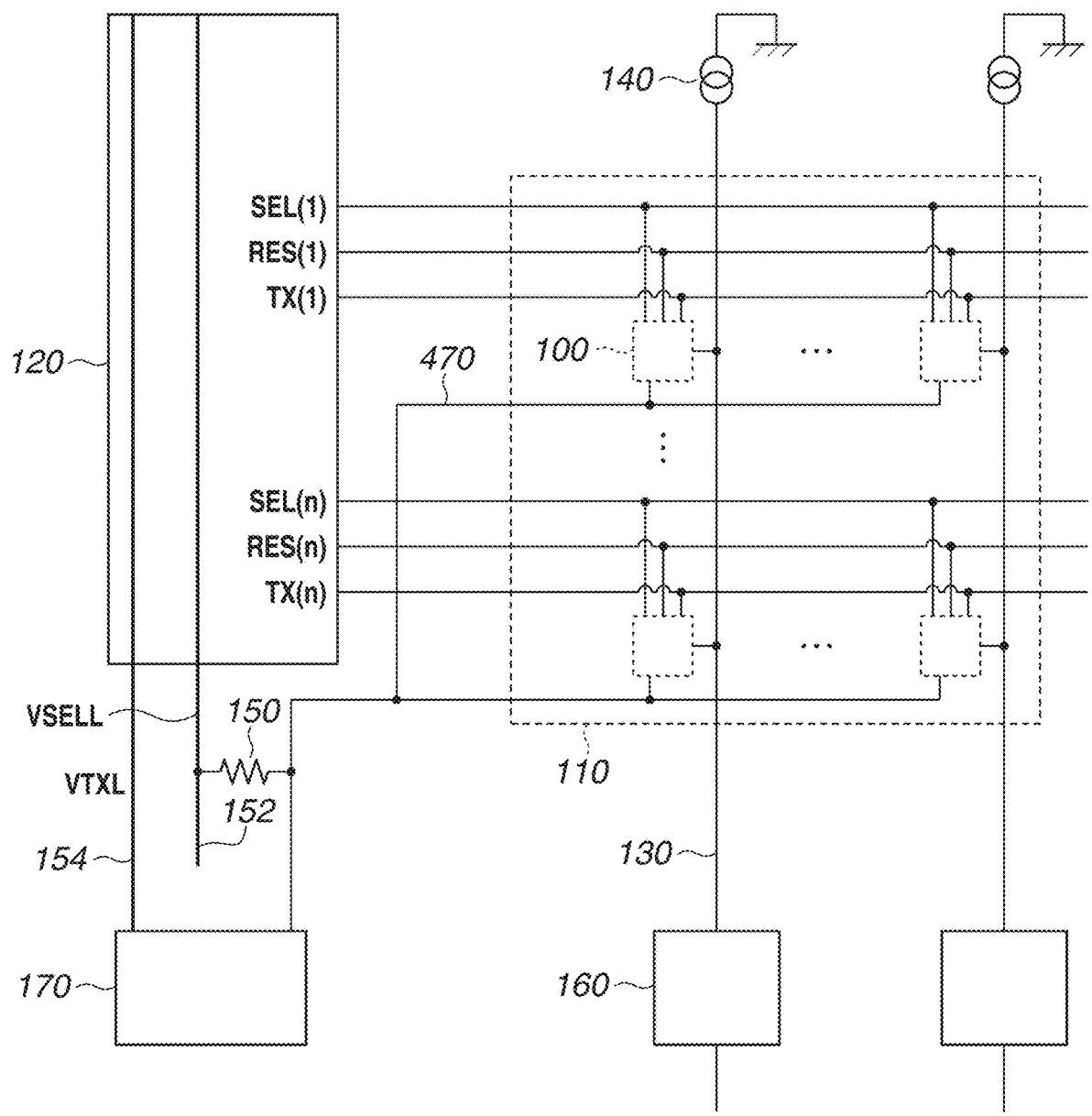
FIG. 10 illustrates the configuration of a photoelectric conversion apparatus.

FIGS. 9 and 10 illustrate schematic views of an imaging apparatus according to the fourth exemplary embodiment. FIG. 9 illustrates an example of another configuration of the pixel 100. FIG. 9 is different from FIG. 2 in terms of the fact that the GND node 450 of the photodiode 400 is replaced with a node 470. FIG. 10 illustrates a similar portion to FIG. 1, but is different from FIG. 1 in terms of the fact that the node 470 from the pixel 100 is connected to the negative voltage supply circuit 170. The pixel 100 has a negative potential as the reference potential therein due to the connection of the node 470 to the negative voltage supply circuit 170. The potential VSELL is connected to the node 470 via the isolator 150.

Due to this configuration, the photoelectric conversion apparatus can prevent or reduce the deterioration of the transfer characteristic of the transfer transistor 410 even when the potentials of the power source potential 460 and the potential VTXH reduce. Further, the present configuration allows the power source potential 460 and the potential VTXH to have lower potentials, thereby contributing to reducing power consumption. Further, due to the provision of the isolator 150, the photoelectric conversion apparatus can prevent or reduce propagation of the change due to the second potential line 154 derived from the potential change in the signal line 130 to the node 470. As a result, the photoelectric conversion apparatus can prevent or reduce a potential change in the FD 420 due to capacitive coupling between the node 470 and the FD 420.

Further, the potential VSELL may be connected to the potential VTXL via the isolator 150 similarly to the first exemplary embodiment. This connection allows the present exemplary embodiment to also achieve the beneficial effects of the first exemplary embodiment altogether. Further, the present exemplary embodiment can also be combined with the second exemplary embodiment and/or the third exemplary embodiment.

The pixel 100 illustrated in FIG. 2 is an example, and is not limited thereto. Further, one signal line 130 is laid for one pixel column in the illustrated example, but the number of signal lines 130 is not limited thereto. The photoelectric conversion apparatus may include four control lines 130, eight control lines 130, twelve signal lines 130, or the like. The signal processing circuit 160 may include a gain amplifier and/or an analog-to-digital converter (ADC).

Figure 12A:
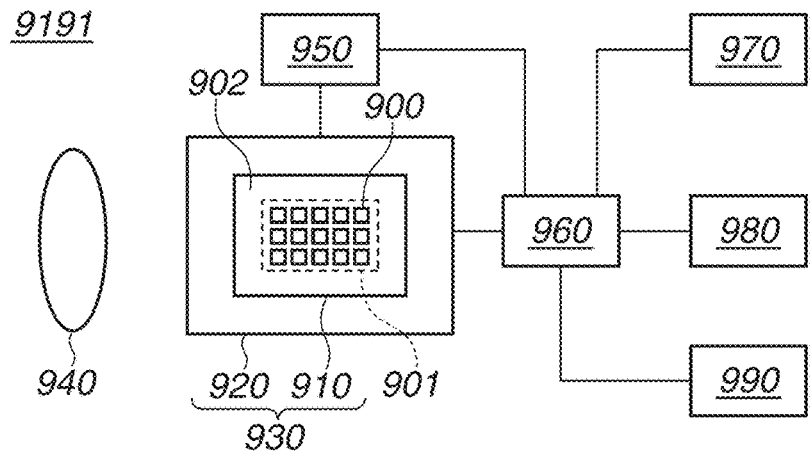
FIGS. 12A to 12C illustrate the configuration of an apparatus.

A fifth exemplary embodiment is applicable to any of the first to fourth exemplary embodiments. FIG. 12A is a schematic view illustrating an apparatus 9191 including a semiconductor apparatus 930 according to the present exemplary embodiment. The apparatus 9191 including the semiconductor apparatus 930 will be described in detail. The semiconductor apparatus 930 can include a package 920 containing a semiconductor device 910 in addition to the semiconductor device 910 including a semiconductor layer 10 as described above. The package 920 can include a base member on which the semiconductor device 910 is fixed, and a cover member such as glass facing the semiconductor device 910. The package 920 can further include bonding members such as a bonding wire and a bump connecting a terminal provided on the base member and a terminal provided on the semiconductor device 910.

The apparatus 9191 can include at least any of an optical device 940, a control device 950, a processing device 960, a display device 970, a storage device 980, and/or a mechanical device 990. The optical device 940 corresponds to the semiconductor apparatus 930. The optical device 940 is, for example, a lens, a shutter, and/or a mirror. The control device 950 controls the semiconductor apparatus 930. The control device 950 is, for example, a semiconductor device such as an application specific integrated circuit (ASIC).

The processing device 960 processes a signal output from the semiconductor apparatus 930. The processing device 960 is a semiconductor device such as a central processing unit (CPU) or an ASIC for forming an analog front end (AFE) or a digital front end (DFB). The display device 970 is an electro-luminescence (EL) display device or a liquid crystal display device that displays information (an image) acquired by the semiconductor apparatus 930. The storage device 980 is a magnetic device or a semiconductor device that stores information (an image) acquired by the semiconductor apparatus 930. The storage device 980 is a volatile memory such as a static random access memory (SRAM) or a dynamic random access memory (DRAM), or a nonvolatile memory such as a flash memory or a hard disk drive.

The mechanical device 990 includes a movable unit or a thrust unit, such as a motor or an engine. The apparatus 9191 displays the signal output from the semiconductor apparatus 930 on the display device 970 or transmits this signal to outside using a communication device (not illustrated) included in the apparatus 9191. For achieving this function, in one embodiment, the apparatus 9191 further includes the storage device 980 and the processing device 960 in addition to a storage circuit and an arithmetic circuit included in the semiconductor apparatus 930. The mechanical device 990 may be controlled based on the signal output from the semiconductor apparatus 930.

Further, the apparatus 9191 is suitable to an electronic apparatus such as an information terminal having an imaging function (for example, a smart-phone or a wearable terminal) or a camera (for example, an interchangeable-lens camera, a compact camera, a video camera, or a monitoring camera). The mechanical device 990 in the camera can drive a component of the optical device 940 for zooming, focusing, and a shutter operation. Alternatively, the mechanical device 990 in the camera can move the semiconductor apparatus 930 for an image stabilization operation.

Further, the apparatus 9191 can be a transportation apparatus, such as a vehicle, a ship, or a flight vehicle. The mechanical device 990 in the transportation apparatus can be used as a movement device. The apparatus 9191 as the transportation apparatus is effectively usable for an apparatus on which the semiconductor apparatus 930 is transported or an apparatus in which the driving (maneuvering) thereof is assisted and/or automated using the imaging function. The processing device 960 for assisting and/or automating the driving (maneuvering) can perform processing for operating the mechanical device 990 as the movement device based on the information acquired by the semiconductor apparatus 930. Alternatively, the apparatus 9191 may be a medical appliance such as an endoscope, a measurement instrument such as a ranging sensor, an analytical instrument such as an electronic microscope, an office appliance such as a copying machine, or industrial equipment such as a robot.

According to the above-described exemplary embodiment, it becomes possible to acquire an excellent pixel characteristic. Therefore, the value of the semiconductor apparatus can be enhanced Enhancing the value described herein refers to at least any of the addition of a function, the improvement of the performance, the improvement of the characteristic, the improvement of the reliability, the improvement of the manufacturing yield, a reduction in the environmental load, a cost reduction, a size reduction, and/or a weight reduction.

Therefore, even the value of the apparatus 9191 can be enhanced by using the semiconductor apparatus 930 according to the present exemplary embodiment for the apparatus 9191. For example, an excellent performance can be acquired when the semiconductor apparatus 930 is mounted on the transportation apparatus and captures an image outside the transportation apparatus or measures the external environment. Therefore, it is beneficial to determine to mount the semiconductor apparatus 930 according to the present exemplary embodiment onto the transportation apparatus when manufacturing or selling the transportation apparatus in terms of enhancing the performance of the transportation apparatus itself. Especially, the semiconductor apparatus 930 is effectively usable for such a transportation apparatus that the driving of the transportation apparatus is aided and/or the transportation apparatus is autonomously driven using the information acquired by the semiconductor apparatus.

Figure 12B:
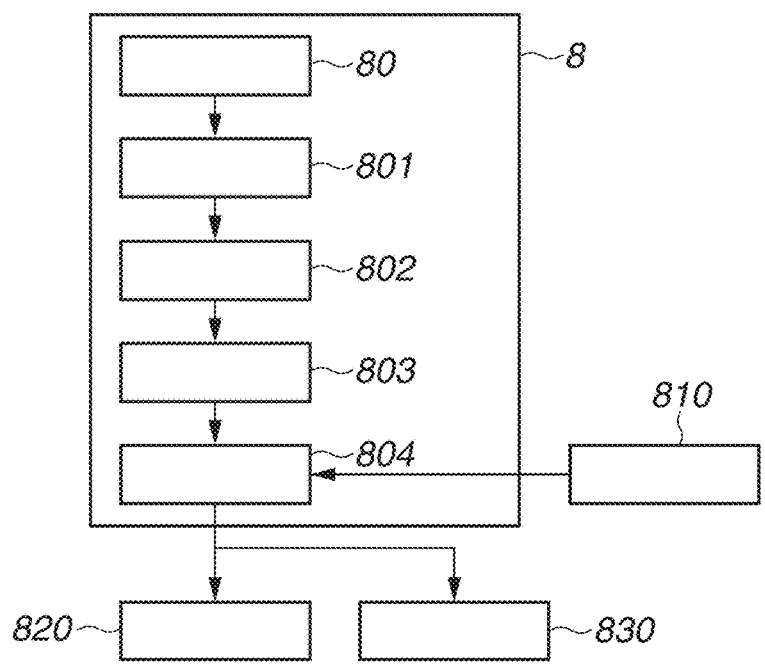

FIG. 12B illustrates a photoelectric conversion system 8 for an on-vehicle camera as an example of the photoelectric conversion system. The photoelectric conversion system 8 has a photoelectric conversion apparatus 80. The photoelectric conversion apparatus 80 is the photoelectric conversion apparatus (the imaging apparatus) described in any of the above-described exemplary embodiments. The photoelectric conversion system 8 has an image processing unit 801 that performs image processing on a plurality of pieces of image data acquired by the photoelectric conversion apparatus 80, and a parallax acquisition unit 802 that calculates a parallax (a phase difference between parallax images) from a plurality of pieces of image data acquired by the photoelectric conversion system 8. The photoelectric conversion system 8 further includes a distance acquisition unit 803 that calculates a distance to a target object based on the calculated parallax, and a collision determination unit 804 that determines whether there is a possibility of collision based on the calculated distance. The parallax acquisition unit 802 and the distance acquisition unit 803 are examples of a distance information acquisition unit that acquires distance information about a distance to a target object. In other words, the distance information is information about a parallax, a defocus amount, a distance to a target object, and the like. The collision determination unit 804 may determine a possibility of collision, using any of these pieces of distance information. The distance information acquisition unit may be implemented by specifically designed hardware or may be implemented by a software module. The distance information acquisition unit may also be implemented by a device such as a field programmable gate array (FPGA) or an application specific integrated circuit (ASIC) or may be implemented by the combination of these.

The photoelectric conversion system 8 is connected to a vehicle information acquisition apparatus 810, and is capable of acquiring vehicle information such as a vehicle speed, a yaw rate, and a steering angle. The photoelectric conversion system 8 is also connected to a control engine control unit (ECU) 820 that outputs a control signal for applying a braking force to a vehicle, based on a result of the determination by the collision determination unit 804. The photoelectric conversion system 8 is also connected to an alarm apparatus 830 that issues an alarm to a driver based on the result of the determination by the collision determination unit 804. For example, in a case where there is a high possibility of collision based on the result of the determination by the collision determination unit 804, the control ECU 820 performs vehicle control to avoid a collision or reduce damage by, for example, applying brakes, releasing an accelerator, or restraining engine power. The alarm apparatus 830 warns a user by, for example, generating an alarm sound, displaying alarm information on a screen of a navigation system, or applying vibrations to a seat belt or a steering wheel.

Figure 12C:
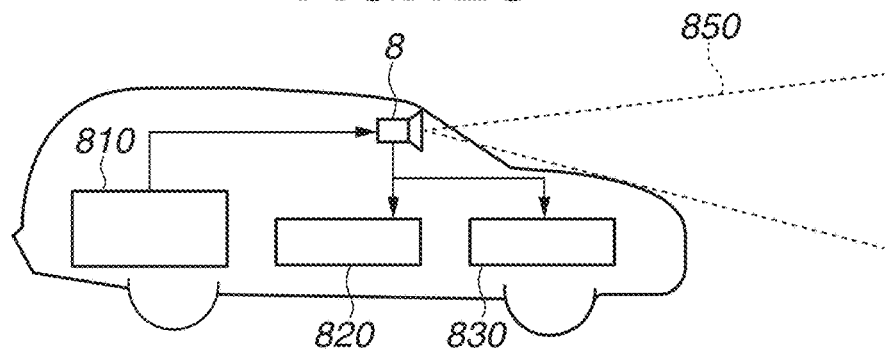

In the present exemplary embodiment, the photoelectric conversion system 8 images an area around the vehicle such as a front side or a rear side of the vehicle. FIG. 12C illustrates the photoelectric conversion system 8 in a case where the front side of the vehicle (an imaging range 850) is imaged. The vehicle information acquisition apparatus 810 transmits an instruction to the photoelectric conversion system 8 or the photoelectric conversion apparatus 80. This configuration can improve the accuracy of ranging.

While the example of control for avoiding a collision with another vehicle is described above, the present exemplary embodiment is also applicable to control for automated driving to follow another vehicle, and control for automated driving not to stray from a traffic lane. Furthermore, the photoelectric conversion system 8 is not limited to the vehicle such as an automobile, and is applicable to, for example, a moving body (a moving apparatus) such as a ship, an airplane, or an industrial robot. In addition, the photoelectric conversion system is applicable to not only the moving body, but also an apparatus that widely uses object recognition, such as an intelligent transport system (ITS).

The above-described exemplary embodiments can be changed as appropriate within a range that does not depart from the technical idea. The contents disclosed in the present specification include not only the contents described in the present specification but also all features recognizable from the present specification and the drawings accompanying the present specification. Further, the contents disclosed in the present specification include complementary sets of the concepts described in the present specification. More specifically, for example, if the present specification contains a description "A is larger than B", the present specification shall be deemed to also contain a disclosure "A is not larger than B" even if the description "A is not larger than B" is omitted. This is because the presence of the description "A is larger than B" should be based on the premise that consideration has been given to the case that "A is not larger than B".

Modified Exemplary Embodiments

The present invention can be modified in various manners without being limited to the above-described exemplary embodiments.

For example, the exemplary embodiments of the present invention also include examples in which a part of the configuration of any of the exemplary embodiments is added to another exemplary embodiment or is replaced with a part of the configuration of another exemplary embodiment.

Any of the above-described exemplary embodiments merely indicates an example of how to embody the present invention when implementing the present invention, and the technical scope of the present invention shall not be construed limitedly by them. In other words, the present invention can be implemented in various manners without departing from the technical idea thereof or the main features thereof.

Due to the technique according to the present disclosure, it is possible to prevent or reduce propagation of a potential change in a signal line to another circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-063494, filed Apr. 2, 2021, which is hereby incorporated by reference herein in its entirety.

What is claimed is:

1. A conversion apparatus comprising:
a conversion unit;
a first transistor configured to receive a charge in the conversion unit at a gate thereof;
a second transistor connected to the gate;
a signal line configured such that a signal is output from the first transistor thereto;
a third transistor provided in a path between the signal line and the first transistor;
a first line configured to supply a potential for turning off the second transistor;
a second line configured to supply a potential for turning off the third transistor that is a common potential also used as the potential for turning off the second transistor; and
an isolator connected to the first line and the second line.

2. The conversion apparatus according to claim 1, wherein the isolator is a resistive element.

3. The conversion apparatus according to claim 2, wherein a resistance value of the resistive element is 10Ω or higher.

4. The conversion apparatus according to claim 2, wherein a resistance value of the resistive element is 1000Ω or lower.

5. The conversion apparatus according to claim 2, wherein a resistance value of the resistive element is 60Ω or higher and 150Ω or lower.

6. The conversion apparatus according to claim 2, wherein the resistive element includes polysilicon.

7. The conversion apparatus according to claim 2, wherein the resistive element includes a diffusion region in which an impurity is diffused in a substrate.

8. The conversion apparatus according to claim 1, further comprising a supply unit,
wherein the first line is connected to the supply unit, and
wherein the second line is connected to the supply unit via the isolator.

9. The conversion apparatus according to claim 1, further comprising:
a plurality of pixels each including the conversion unit, the first transistor, the second transistor, and the third transistor, the plurality of pixels being arranged across a plurality of rows; and
a vertical scanning circuit configured to scan the pixels in the plurality of rows row by row,
wherein the first line and the second line are connected to the vertical scanning circuit.

10. The conversion apparatus according to claim 1, further comprising:
a plurality of pixels each including the conversion unit, the first transistor, the second transistor, and the third transistor, the plurality of pixels being arranged across a plurality of rows;
a plurality of vertical scanning circuits configured to scan the pixels in the plurality of rows row by row;
a plurality of the first lines;
a plurality of the second lines; and
a plurality of the isolators,
wherein at least one of the plurality of first lines, at least one of the plurality of second lines, and at least one of the plurality of isolators are arranged in correspondence with each of the plurality of vertical scanning circuits.

11. The conversion apparatus according to claim 10, wherein the plurality of isolators is connected to one of the plurality of first lines and one of the plurality of second lines.

12. The conversion apparatus according to claim 10, further comprising a plurality of pads to which the first lines are connected,
wherein each of the plurality of isolators is provided in correspondence with one of the plurality of pads.

13. The conversion apparatus according to claim 1, wherein the common potential is a negative potential.

14. The conversion apparatus according to claim 1, wherein the second transistor is connected to the conversion unit.

15. The conversion apparatus according to claim 1, wherein the second transistor is connected to a holding unit configured to hold a charge in the conversion unit.

16. The conversion apparatus according to claim 1, wherein the second transistor is connected to a power source voltage.

17. The conversion apparatus according to claim 1, wherein the second transistor is a transistor configured to switch a capacitance value of a capacitor connected to the gate.

18. An apparatus including the conversion apparatus according to claim 1, further comprising at least any of:
an optical device corresponding to the conversion apparatus;
a control device configured to control the conversion apparatus;
a processing device configured to process a signal output from the conversion apparatus;
a display device configured to display information acquired by the conversion apparatus;
a storage device configured to store information acquired by the conversion apparatus; and/or
a mechanical device configured to operate based on information acquired by the conversion apparatus.

19. A substrate configured to be laminated on a substrate including a conversion unit, a first transistor configured to receive a charge in the conversion unit at a gate thereof, a second transistor connected to the gate, a signal line configured such that a signal is output from the first transistor thereto, and a third transistor provided in a path between the signal line and the first transistor, the substrate comprising:
a first line configured to supply a potential for turning off the second transistor;

a second line configured to supply a potential for turning off the third transistor that is a common potential also used as the potential for turning off the second transistor; and an isolator connected to the first line and the second line.

\* \* \* \* \*